Oct. 15, 1957  J. GILLESPIE ET AL  2,809,661
LIQUID DISTRIBUTION SYSTEM

Filed May 27, 1954  2 Sheets-Sheet 1

INVENTORS.
ALLEN T. CORDILL, &
JOSEPH GILLESPIE.
BY
Their ATTORNEY

Oct. 15, 1957 J. GILLESPIE ET AL 2,809,661
LIQUID DISTRIBUTION SYSTEM
Filed May 27, 1954 2 Sheets-Sheet 2

INVENTORS.
ALLEN T. CORDILL
JOSEPH GILLESPIE
BY
their ATTORNEY

United States Patent Office 2,809,661
Patented Oct. 15, 1957

2,809,661

LIQUID DISTRIBUTION SYSTEM

Joseph Gillespie and Allen T. Cordill, Indianapolis, Ind., assignors to Standard Steel Manufacturing Co., Inc., Indianapolis, Ind., a corporation of Indiana Application May 27, 1954, Serial No. 432,841

3 Claims. (Cl. 137—565)

This invention is concerned broadly with apparatus for the distribution of liquids. More specifically the invention is concerned with an apparatus for the distribution of liquid fertilizers. In an important aspect the invention relates to a distribution chamber in the aforementioned apparatus which is adapted to distribute liquids in a plurality of streams either under gravity or forced flow, i. e. under pressure. A particular feature of the distribution chamber lies in the fact that the chamber provides means for optional pressure or gravity distribution without putting pressure on any other part of the system. That is, the distribution system can be shifted easily from gravity operation to forced flow without putting pressure on any non-pressure portion or vessel in the system.

The apparatus of this invention provides the farmer with an efficient and economical means for application of liquid fertilizers. A particular economy of this apparatus is noted in the initial cost of the application equipment. Heretofore, the cost of equipment for the distribution has been prohibitive for the average farmer who, as a result, has been forced to turn to custom fertilizing. That is, he was forced to hire the owner of expensive distribution equipment to spread the liquid fertilizer if he wanted to take advantage of the low cost per pound of nitrogen afforded by liquid nitrogenous fertilizer. The distribution equipment has been expensive because of the corrosive nature of liquid fertilizer and the necessary pressure construction in the previously known apparatus.

The present invention overcomes these deficiencies and makes available at a low cost a distribution system which is resistant to corrosion adapted to either gravity or pressure operation, and which can be shifted quickly and easily from one method of distribution to the other.

The apparatus of the invention comprises, in combination, a storage means adapted to supply liquid via an outlet located in the lower portion thereof, said outlet being connected to a first liquid conduit containing a first valve means and a T downstream thereof, said T having a valve seat surface positioned at the downstream extremity of the run of the T, said extremity of the run being connected to and positioned within a top opening of a distributor means disposed at a level below said storage means, said distributor means comprising a pressure chamber having axially disposed a top and a bottom opening, guide members disposed within said chamber adapted to guide vertical movement of a valve stem, said valve stem having a valve disc attached thereto adapted to cooperate with said valve seat surface of said T, said valve stem being supported by a spring disposed adjacent to said bottom opening, said spring being adapted to position said valve disc against said valve seat surface and being further adapted to being compressed by the weight of liquid on said valve disc when said first valve means is open, said valve stem being responsive to upward dynamic liquid pressure resulting when liquid is supplied under pressure to said chamber via said bottom opening, said bottom opening being provided with closure means and being further adapted to be connected to the outlet of a pump means, said pump means being connected to the cross of said T; a plurality of discharge openings in said chamber disposed in a plane perpendicular to and between said top and bottom openings; a plurality of second liquid conduit means from said discharge openings to desired delivery positions below said openings; said second liquid conduit means having at their extremities replaceable flow control orifices.

In a preferred embodiment of the invention the storage means is a tank fabricated from No. 12 gauge prime quality hot-rolled, pickled and oiled steel lined with plasticized bituminous based enamel. Further the first valve means is an aluminum body, quarter-turn, quick-opening, diaphragm valve. The distributor means preferably is fabricated of stainless steel in the shape of a modified globe or sphere. The fittings, nozzles or orifices and discharge tubes from said distributor means are preferably of stainless steel and aluminum. The conduit means are preferably of "neoprene" hose. This construction eliminates clogging and wear problems caused by corrosion and permits application of fertilizer while plowing, discing, side dressing or the like or as individually desired in conjunction with any farming operation.

Figure 1:
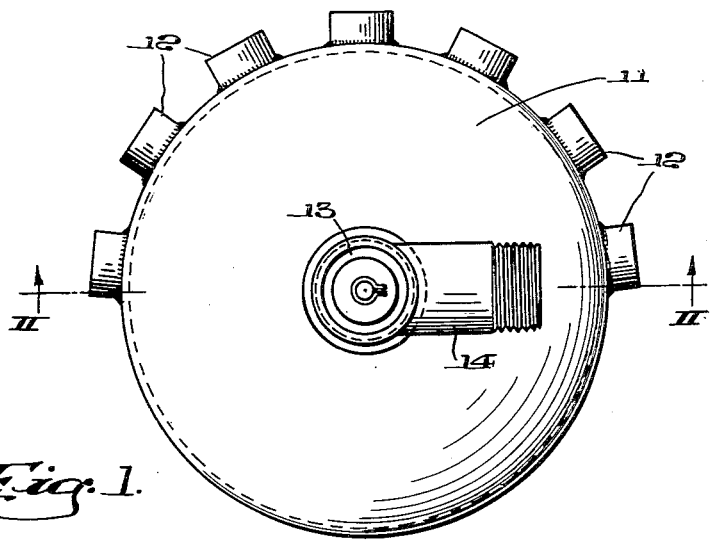
Figure 1 is a top plan view of the preferred embodiment of a distributor means of this invention.

Referring to the drawings, Figure 1 illustrates a pressure chamber 11, having a plurality of discharge openings 12 and a T 13 connected to a top opening in said pressure chamber. Also illustrated is the nipple 14 which is adapted to be connected to the inlet of a pump means.

Figure 2:
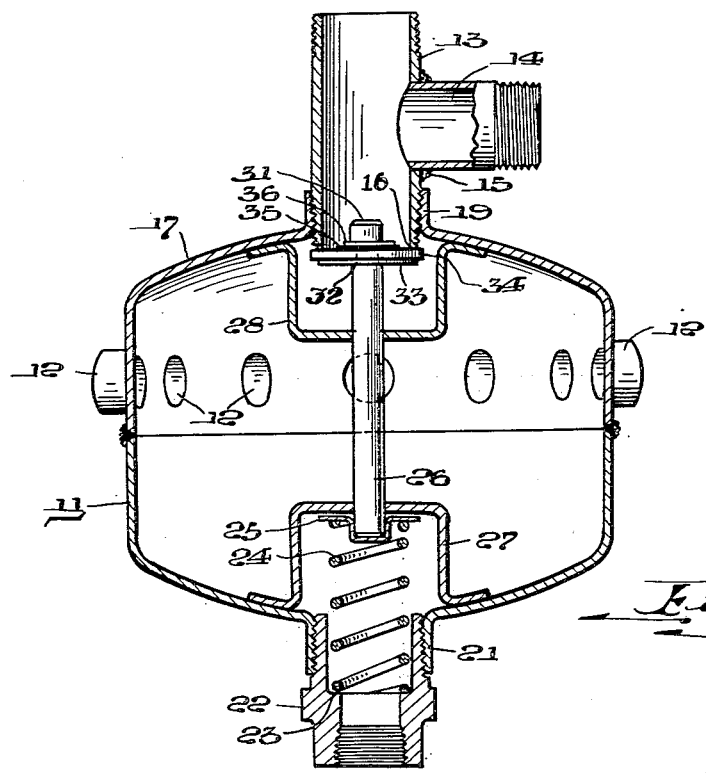
Figure 2 is a vertical section on the line II—II of Figure 1.

As shown in Figure 2, the T 13 is threaded at its upper and lower portions and at its lower extremity has a valve seat surface 16. The T 13 is threadably connected to the top opening lip 19 of the chamber 11. Opposite the top opening and disposed axially therewith is the bottom opening defined by the lip 21 which is threaded interiorly. Threadably connected to said lip 21 is the nipple 22 having the interior shoulders 23 and being threaded interiorly at its lower extremity. The shoulders 23 support the spring 24 which supports the clip 25 which is adapted to receive and support the valve stem 26 which moves vertically between the guide members 27 and 28 which are attached to the shell 17 at points adjacent the bottom and top openings of the chamber 11 respectively. At the top portion of the valve stem 26 is the shank portion 31 and the shoulder 32, which supports the washer 33, the valve disc 34, the washer 35 and the hold down clip 36.

Figure 3:
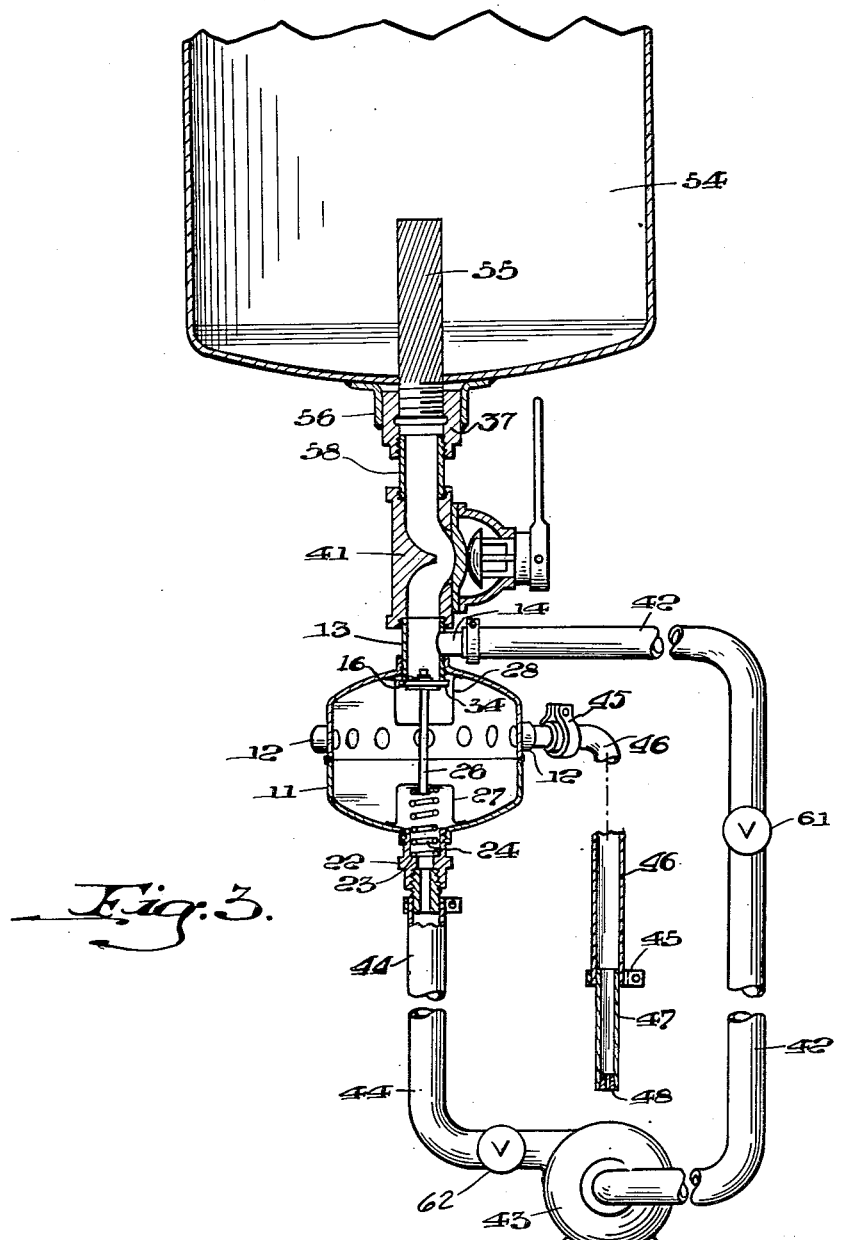
Figure 3 is a schematic representation of an apparatus of this invention showing the combination of tank, first valve means, distributor means, pump and liquid conduit discharge means.

Figure 3 illustrates the tank 54 which is equipped with the strainer 55 and the outlet lip 56. The strainer 55 is attached to the connector 37 which is threaded interiorly at its lower portion to receive the nipple 58, which connects to the valve 41. This valve 41 is a quarter-turn quick-opening diaphragm valve with an aluminum body and is connected to the T 13 which is connected to the pressure chamber 11 as aforementioned.

Also illustrated in Figure 3 is the liquid conduit means 42 connecting the pump means 43 to the nipple of T 13. It will be realized that the conduit means 42 can have a closure means therein if so desired as illustrated by valve means 61 which valve means allows isolation of pump 43 from the nipple 14 of T 13. The outlet of the pump means 43 is connected to the liquid conduit means 44 which like the conduit means 42 can contain a closure means if desired as illustrated by valve means 62 which valve means provides means for isolating the bottom opening of the chamber 11 from pump 43.

Leading from one of the discharge openings 12 and connected thereto by the clamp 45 is shown the liquid discharge conduit 46 leading to a delivery tube 47. This tube 47 is attached to the conduit 46 by a clamp 45 and contains at its outlet a nozzle 48. The nozzle 48 is replaceable by a nozzle of similar outside diameter having a different sized hole therein. The nozzles 48 are frictionally held in tube 47.

The operation of the entire apparatus of the invention can best be illustrated by reference to Figure 3. For gravity operation the pump means 43 is turned off and if desired the optional closure means in conduits 42 and 44 are closed. Valve 41 is opened allowing the liquid to flow from tank 54 through the strainer 55, through the nipple 58, through the valve 41, through the run of the T 13 into contact with the valve disc 34. The pressure of the liquid on the face of this disc 34 overcomes the effect of the spring 24 which has held the disc 34 lightly against the valve seat face 16. The liquid then flows into the pressure chamber 11 and fills said chamber up to the level of the discharge outlets 12 whereupon it flows through the conduits 46 into the tubes 47 and through the nozzles 48 to desired delivery points determined by positioning the tubes 47.

When it is desired to operate the system under pressure all that is required is to open the optional closure means in conduits 42 and 44 and to start the pump means 43. As the liquid is drawn out of the T 13 via the nipple 14 to the inlet of the pump 43, the spring 24 positions the valve disc 34 lightly against the seat 16 as aforedescribed. As the liquid passes through the pump 43 and the conduit 44 into the bottom opening of the pressure chamber 11 the dynamic pressure acts on the valve stem 26 via the clip 25 to urge the disc 34 tightly against the seat 16. Thus, the liquid flow is from the tank 54 through the strainer 55, the nipple 58, the T 13, the nipple 14, the conduit 42, the pump means 43, the conduit 44, into the pressure chamber 11, through the discharge outlets 12, the conduits 46, the tubes 47 and the nozzles 48. It will be seen that this arrangement provides easy transfer from one system of operation to the other and when operating under pressure puts only the pressure chamber under pressure. The other portions of the system are at ordinary pressure.

It will be realized that each of the discharge openings 12 is, or can be, furnished with a conduit 46, tube 47 and nozzle 48. Further, there can be used as many of discharge openings 12 as desired, the others being plugged.

It has been found to be convenient to utilize nozzles with orifices having No. 17 and No. 40 end diameters in the tubes 47.

A feature of the above described apparatus is that it gives even distribution from all nozzles regardless of the length of hose in conduits 46 or the amount of liquid in the supply tank.

Obviously many modifications and variations of the invention as hereinbefore set forth may be made without departing from the spirit and scope thereof and therefore only such limitations should be imposed as are indicated in the appended claims.

What is claimed as new is:

1. In an apparatus for the distribution of liquids the combination comprising a storage means adapted to supply liquid via an outlet located in the lower portion thereof, said outlet being connected to a first liquid conduit containing a first valve means and a T downstream thereof, said T having a valve seat surface positioned at the downstream extremity of the run of the T, said extremity of the run being connected to and positioned within a top opening of a distributor means disposed at a level below said storage means, said distributor means comprising a pressure chamber having axially disposed a top and a bottom opening, guide members disposed within said chamber adapted to guide vertical movement of a valve stem, said valve stem having a valve disc attached thereto adapted to cooperate with said valve seat surface of said T, said valve stem being supported by a spring disposed adjacent to said bottom opening, said spring being adapted to position said valve disc against said valve seat surface and being further adapted to being compressed by the weight of liquid on said valve disc when said first valve means is open, said valve stem being responsive to upward dynamic liquid pressure resulting when liquid is supplied under pressure to said chamber via said bottom opening, said bottom opening being further adapted to be connected to the outlet of a pump means, said pump means being connected to the cross of said T; a plurality of discharge openings in said chamber disposed in a plane perpendicular to and between said top and bottom openings; a plurality of second liquid conduit means from said discharge openings to desired delivery positions below said openings; said second liquid conduit means having at their extremities replaceable flow control orifices.

2. In an apparatus for distribution of liquid fertilizer a distributor means comprising a pressure chamber having axially disposed a top and bottom opening and a plurality of discharge openings in said chamber disposed in a plane perpendicular to and between said top and bottom openings, guide members disposed within said chamber adapted to guide vertical movement of a valve stem, said valve stem having a valve disc attached thereto adapted to cooperate with a valve seat surface positioned adjacent to said top opening, said valve stem being supported by a spring disposed adjacent to said bottom opening, said spring being adapted to position said valve disc against said seat surface, and being further adapted to being compressed by the weight of liquid on said valve disc, said valve stem being responsive to upward dynamic liquid pressure resulting when liquid is supplied under pressure to said chamber via said bottom opening.

3. In an apparatus for the distribution of liquids the combination comprising a storage means adapted to supply liquid via an outlet located in the lower portion thereof, said outlet being connected to a first liquid conduit containing a first valve means and a T downstream thereof, said T having a valve seat surface positioned at the downstream extremity of the run of the T, said extremity of the run being connected to and positioned within a top opening of a distributor means disposed at a level below said storage means, said distributor means comprising a pressure chamber having axially disposed a top and a bottom opening, guide members disposed within said chamber adapted to guide vertical movement of a valve stem, said valve stem having a valve disc attached thereto adapted to cooperate with said valve seat surface of said T, said valve stem being supported by a spring disposed adjacent to said bottom opening, said spring being adapted to position said valve disc against said valve seat surface and being further adapted to being compressed by the weight of liquid on said valve disc when said first valve means is open, said valve stem being responsive to upward dynamic liquid pressure resulting when liquid is supplied under pressure to said chamber via said bottom opening, said bottom opening being further adapted to be connected to the outlet of a pump means, said pump means being connected to the cross of said T; means for isolating said pump means from said bottom opening; means for isolating said pump means from said T; a plurality of discharge openings in said chamber disposed in a plane perpendicular to and between said top and bottom openings; a plurality of second liquid conduit means from said discharge openings to desired delivery positions below said openings; said second liquid conduit means having at their extremities replaceable flow control orifices.

References Cited in the file of this patent

UNITED STATES PATENTS

| | | |
|---|---|---|
| 130,835 | Bailey | Aug. 27, 1872 |
| 1,218,089 | Kail | Mar. 6, 1917 |
| 1,697,352 | Ferris | Jan. 1, 1929 |